s

US006446135B1

(12) United States Patent
Koppolu et al.

(10) Patent No.: US 6,446,135 B1
(45) Date of Patent: Sep. 3, 2002

(54) METHOD AND SYSTEM FOR QUERYING AND EXECUTING COMMANDS OF AN APPLICATION PROGRAM

(75) Inventors: Srinivasa R. Koppolu; C. Douglas Hodges, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/611,209

(22) Filed: Mar. 5, 1996

(51) Int. Cl.[7] .................................................. G06F 9/54
(52) U.S. Cl. ...................................... 709/313; 709/328
(58) Field of Search ............................... 707/515, 516; 395/680, 682, 683; 709/328, 315, 313

(56) References Cited

U.S. PATENT DOCUMENTS

| 5,089,956 A | | 2/1992 | MacPhail | 395/600 |
|---|---|---|---|---|
| 5,101,345 A | | 3/1992 | MacPhail | 395/600 |
| 5,179,718 A | | 1/1993 | MacPhail | 395/800 |
| 5,297,284 A | * | 3/1994 | Jones et al. | 717/137 |
| 5,301,326 A | * | 4/1994 | Linnett et al. | 709/320 |
| 5,475,817 A | * | 12/1995 | Waldo et al. | 709/316 |
| 5,477,447 A | * | 12/1995 | Luciw et al. | 704/9 |
| 5,530,864 A | * | 6/1996 | Matheny et al. | 709/315 |
| 5,613,058 A | * | 3/1997 | Koppolu et al. | 345/744 |
| 5,619,710 A | * | 4/1997 | Travis, Jr. et al. | 709/203 |
| 5,640,564 A | * | 6/1997 | Hamilton et al. | 709/315 |
| 5,664,208 A | * | 9/1997 | Pavley et al. | 707/515 |
| 5,761,684 A | * | 6/1998 | Gibson | 707/515 |
| 5,764,960 A | * | 6/1998 | Perks et al. | 345/841 |
| 5,890,122 A | * | 3/1999 | Van Kleeck et al. | 704/275 |

OTHER PUBLICATIONS unknown, "OLE 2 Programmer's Reference," Dec. 1994, Microsoft Press, vol. One: Working with Windows Objects, pp. 153–175.*

* cited by examiner

Primary Examiner—Zarni Maung
Assistant Examiner—Gary Scott Fourson
(74) Attorney, Agent, or Firm—Merchant & Gould (57) ABSTRACT

A method and system for querying and executing commands of an application program are provided. A caller application program may dispatch a request for status information to a callee application program for one or more commands. That is, the caller application program can determine which commands a callee application program provides and determine the status of each of those commands. In particular, the caller application program may request a bit representation of the status of a command, may request a textual representation of a status of the command, or may request a textual representation of the name of a command. In addition, the caller application program may dispatch a request to execute a command to the callee application program. Moreover, the caller application program may specify whether the callee application program should request user input before executing the command. Furthermore, the caller application program may request that the callee application program provide help information for the command rather than execute the command. Additionally, predefined commands are provided and application defined commands can be defined.

22 Claims, 7 Drawing Sheets

METHOD AND SYSTEM FOR QUERYING AND EXECUTING COMMANDS OF AN APPLICATION PROGRAM

TECHNICAL FIELD

The present invention relates generally to data processing systems and, more particularly, to querying and executing commands of an application program.

BACKGROUND OF THE INVENTION

In Microsoft OLE 2.01, a "containee object" is contained within a "container object." The container object is associated with a "container application program" and the containee object is associated with a "server application program." The server application program provides the containee object to the container application program for embedding within the container object. Each object has an associated tool bar which displays icons representing commands. A command is an action which may be performed by the associated application program. When a containee object is selected and an operation to be performed on the containee object, such as displaying the containee object for viewing, is specified (i.e., the containee object is activated), by convention, a user interface is displayed showing the containee object's tool bar and not the container object's tool bar. The containee object's tool bar contains commands which apply to the container object, such as the Save command, and commands which apply only to the activated containee object, such as an AutoSum command. Commands which apply to the container object are supported by the container application program. Commands which apply to the containee object are supported by the server application program. The server application program does not perform commands which apply to the container object. Therefore, the server application program disables commands in its tool bar which apply to the container object.

A user may execute a command by selecting the icon that represents the command. When a command is selected which applies to the containee object, the server application program receives a message from the operating system indicating the selection, and the server application program processes the message by performing the selected command. However, because commands applying to the container object are disabled, the user cannot execute the commands supported by the container application program.

Also, some conventional systems provide compound documents. A compound document may contain information in different formats. For example, a compound document may contain data in text format, such as a word processing document, or in chart format, such as a worksheet. In particular a "MICROSOFT WORD" document may be a compound document which contains a "MICROSOFT POWERPOINT" graph and a "MICROSOFT EXCEL" worksheet. The "MICROSOFT WORD" document is a container object which contains containee objects, the "MICROSOFT POWERPOINT" graph and the "MICROSOFT EXCEL" worksheet. A containee object may be embedded in the container object or the containee object may be linked to the container object. When a containee object is embedded in the container object, the containee object is stored in the container object. When a containee object is linked in a container object, the container object includes a link (i.e., a reference) to the containee object. As discussed above, each containee object is associated with a server application program. In addition, typically, the container application program associated with the container object provides commands which apply to all of the compound document (e.g., a save command). However, the container application program typically cannot programmatically dispatch a request to execute a command to a server application program which is associated with a particular containee object in the compound document (e.g., the container application program cannot request the server application program to save its associated object).

Furthermore, in some conventional systems, the server application program can programmatically dispatch a request to execute commands to the container application program. In other conventional systems, the container application program can programmatically dispatch a request to execute commands to the server application program. However, typically, conventional systems are not available in which the container application program and the server application program may both programmatically dispatch requests to execute commands to the other.

In addition, in some conventional systems, a high-level function is provided which enables a container application program to dispatch a request to execute commands to a server application program and which enables a server application program to dispatch a request to execute commands to a container application program. However, typically, the high-level function is very complicated. In addition, conventional systems typically require the use of complex data structures for passing information which is used to execute a command when using the high-level function.

SUMMARY OF THE INVENTION

The above-described difficulties encountered by conventional systems are overcome by the present invention. In accordance with a first aspect of the present invention, a method is practiced in a data processing system. In this method, a first application and a second application are provided. The second application has a plurality of commands, and each of the commands represents an action which is performable by the second application and which has a status that indicates a current condition of that command. The first application requests the status of one of the commands from the second application. The second application then determines the status of the requested one of the commands and forwards the status to the first application. Then, the first application receives the status of the requested one of the commands from the second application.

In accordance with an additional aspect of the present invention, a method is practiced in a data processing system. In this method, a first application and a second application are provided. The second application has a plurality of commands, and each of the commands represents an action which is performable by the second application. The first application requests a name of one of the commands from the second application. The name provides a textual representation of one of the commands. The second application determines the name of the requested one of the commands and forwards the determined name to the first application. Then, the first application receives the determined name from the second application.

In accordance with yet another aspect of the present invention, a method is practiced in a data processing system. A first application and a second application are provided. The second application has a plurality of commands, and each of the commands represents an action which is performable by the second application and has a status that indicates a current condition of that command. The first application requests a textual representation of the status of one of the commands from the second application. The second application determines the status of the requested one of the commands. Next, the second application determines the textual representation of the status of the requested one of the commands. Then, the second application forwards the determined textual representation of the status of the requested one of the commands to the first application. The first application receives the determined textual representation of the status of the requested one of the commands from the second application.

In accordance with a further aspect of the present invention, a method is practiced in a data processing system which includes a processor running a first application. A second application with associated commands is provided, and each of the associated commands represents an action which is performable by the second application. Under control of the first application, one of the associated commands of the second application is executed. Then, under control of the second application, the action represented by the executed one of the associated commands is performed.

In accordance with a still further aspect of the present invention, a method is practiced in a data processing system. In this method, a first application and a second application are provided. The first application provides a compound document, which is a word processing document that contains data in different formats, including server data in a server format. In addition, the first application has a first command which represents an action which is performable by the first application on the compound document. The second application enables viewing and editing of the server data contained in the compound document provided by the first application. The second application has a second command which represents an action which is performable by the second application on the server data. Moreover, a video display is provided for displaying the first command and the second command. When the displayed first command is selected by a user, the first application performs the action represented by the first command on the compound document. When the displayed second command is selected by the user, the second application performs the action represented by the second command on the server data contained in the compound document provided by the first application.

In accordance with another aspect of the present invention, a method is practiced in a data processing system which includes a video display and a processor running a first application and a second application. The first application has a first object and a first window environment. The second application has a second object which is contained within the first object. In addition, the first application has a first command which represents an action which is performable by the first application on the first object. Also, the second application has a second command which represents an action which is performable by the second application on the second object. The first object is displayed within the first window environment on the video display. The second object is displayed within the first object in the displayed first window environment on the video display. The first command and the second command are displayed on the video display. When the displayed first command is selected by a user, the first application performs the action represented by the displayed first command on the first object. When the displayed second command is selected by the user, the second application performs the action represented by the displayed second command on the second object.

In accordance with yet another aspect of the present invention, a method is practiced in a data processing system. A processor that runs a first application and a second application is provided. The second application has associated commands, and each of the associated commands represents an action which is performable by the second application. A highlevel command is provided which is executable by the first application to execute one of the associated commands of the second application, with the first application specifying one of the associated commands. The first application executes the high-level command, specifying one of the associated commands. Then, the second application performs the action represented by the specified one of the associated commands.

In accordance with a further aspect of the present invention, a method is practiced in a data processing system. A processor that runs a first application and a second application is provided. The second application has associated commands, and each of the associated commands represents an action which is performable by the second application. A high-level command is provided which is executable by the first application to obtain status information on one of the associated commands, with the first application specifying one of the associated commands. The first application executes the high-level command, specifying one of the associated commands. Then, the second application provides status information on the specified one of the associated commands.

In accordance with a still further aspect of the present invention, a data processing system includes a processor that runs a first application and a second application. The second application has associated commands, and each of the associated commands represents an action which is performable by the second application. The data processing system also includes a video display for displaying each of the associated commands. In addition, the data processing system includes a status message generator for determining status information about one of the associated commands of the second application. The status message generator includes a status message receiver for receiving from the first application a request for status information about one of the associated commands of the second application, with the request specifying one of the associated commands. The status message generator also includes a status message source for retrieving from the second application the requested status information about the specified one of the associated commands. Moreover, the status message generator includes a status message provider for returning to the first application the requested status information.

In accordance with an additional aspect of the present invention, a data processing system includes a processor that runs a first application and a second application. The second application has associated commands, and each of the associated commands represents an action which is performable by the second application. The data processing system also includes a video display for displaying each of the associated commands. In addition the data processing system includes a command executing mechanism for executing one of the associated commands of the second application. The command executing mechanism includes a command receiver for receiving from the first application a request to execute one of the associated commands of the second application, with the request specifying one of the associated commands. The command executing mechanism also includes a command performer for performing the action represented by the specified one of the associated commands at the second application.

In accordance with yet another aspect of the present invention, on a computer-readable storage medium, a first application program and a second application program are stored. The first application program dispatches a request for status information to the second application program. Then, the second application program obtains the requested status information and forwards the obtained status information to the first application program.

In accordance with still another aspect of the present invention, on a computer-readable storage medium, a first application program and a second application program are stored. The first application program dispatches a request to the second application program to perform an action. Then, the second application program performs the action.

DETAILED DESCRIPTION OF THE INVENTION

The preferred embodiment of the present invention enhances the interaction of application programs by providing a protocol for enabling two application programs to programmatically dispatch requests for status information and requests to execute commands to each other. In particular, the preferred embodiment provides a command dispatch protocol that defines an interface through which a caller application program and a callee application program may interact. By following the command dispatch protocol, the caller application program may dispatch a request for status information to a callee application program for one or more predefined commands (ie., the caller application program may query a command). That is, the caller application program can determine which commands a callee application program provides and determine the status of each of those commands (e.g., enabled or disabled). In addition, the caller application program may dispatch a request to execute one of the predefined commands to the callee application program. Moreover, the command dispatch protocol enables application defined commands to be defined. Once these are defined, a caller application program can request status information for these application defined commands or execute these application defined commands by dispatching requests to a callee application program.

A container application program may be a callee application program and a server application program may be a caller application program. In this case, the command dispatch protocol enables the server application program to programmatically dispatch commands to the container application program. For example, when a containee object's tool bar is displayed, if a user selects a command which is provided by the container application program, the server application program is able to dispatch a request to the container application program to execute the selected command. Furthermore, a container application program may be a caller application program and a server application program may be the callee application program. In this case, the command dispatch protocol enables the container application program to programmatically dispatch commands to the server application program. For instance, a container application program which provides a compound document may dispatch a request to execute a command to a server application program which is associated with one of the containee objects in the compound document.

In particular, the preferred embodiment enables a caller application program to query status information for commands and to execute those commands provided by a callee application program. In the preferred embodiment, the caller application program may request a bit representation of the status of a command (i.e., a current condition of that command), may request a textual representation of the status of the command, or may request a textual representation of the name of the command. A user may query status information for multiple commands at the same time. In addition, the command dispatch protocol allows the caller application program to execute a command which is provided by the callee application program. The caller application program may specify whether the callee application program should request user input before executing the command. Furthermore, the caller application program may request that the callee application program provide help information for the command rather than execute the command.

The preferred embodiment of the present invention is practiced in an object-oriented environment that supports the Microsoft OLE 2.01 protocol developed by Microsoft Corporation of Redmond, Washington. In order to fully understand the preferred embodiment of the present invention, it is helpful to review some of the fundamental concepts employed within Microsoft OLE 2.01.

An "object class" is the definition of both a data structure and functions that manipulate the data structure. An "object" is an instance of an object class. An "interface" is a group of semantically related functions that are organized into a named unit. The name of the unit is the identifier of the interface. Interfaces have no instantiation in that the interface does not include code for implementing the functions that are identified in the interface; rather, the interface specifies a set of signatures for functions. "Instantiation" refers to the process of creating in-memory structures that represent an object so that the operations can be executed on the object. When an object "supports" an interface, the object provides code for the function specified by the interface. Hence, an object that supports an interface is responsible for providing the code for implementing the functions of the interface. The code that is provided by the object must comply with the signature specified by the interface.

An advantage of using object-oriented techniques is that these techniques can be used to facilitate the sharing of objects. For example, an application program implementing the functions of an instantiated object (a "server" application program) can share the object with another application program (a "container" application program). To allow an object of an arbitrary class to be shared with a container application program, interfaces are defined through which an object can be accessed without the need for the container application program to have access to the class definitions at compile time. Thus, an interface provides a published protocol for two application programs to communicate. Interfaces are typically used for derivation: an application program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

Figure 1:
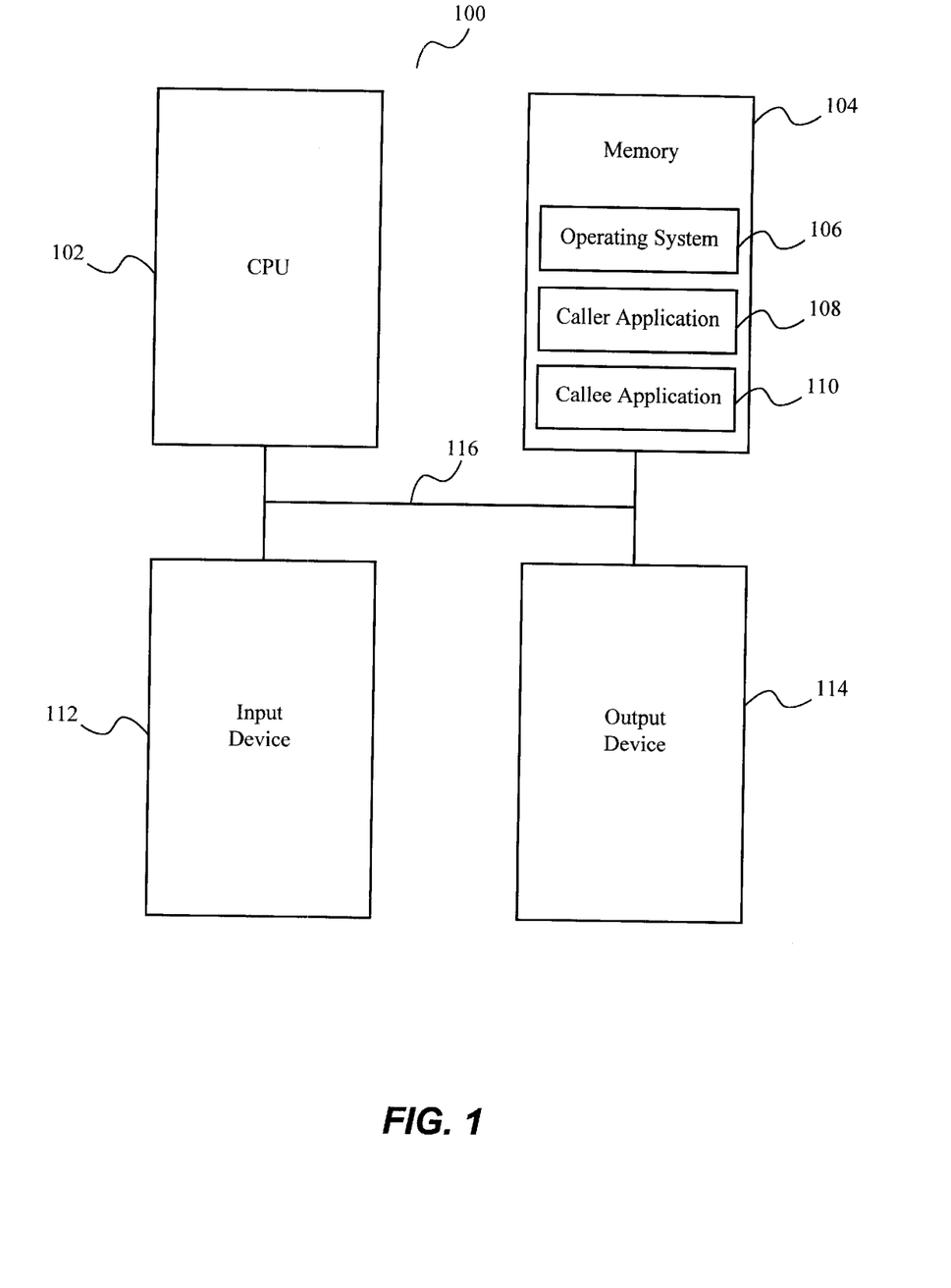
FIG. 1 is a block diagram of a computer system which is suitable for practicing the preferred embodiment of the present invention.

FIG. 1 is a block diagram of a computer system 100 which is suitable for practicing the preferred embodiment of the present invention. The computer system 100 includes a central processing unit (CPU) 102. The computer system 100 also includes a memory 104, which contains an operating system 106, a caller application program 108, and a callee application program 110. In addition, the computer system 100 includes an input device 112, such as a mouse or a keyboard. Moreover, the computer system 100 includes an output device 114, such as a video display. The components of the computer system 100 are connected by a connection mechanism 116, such as a bus.

Figure 2:
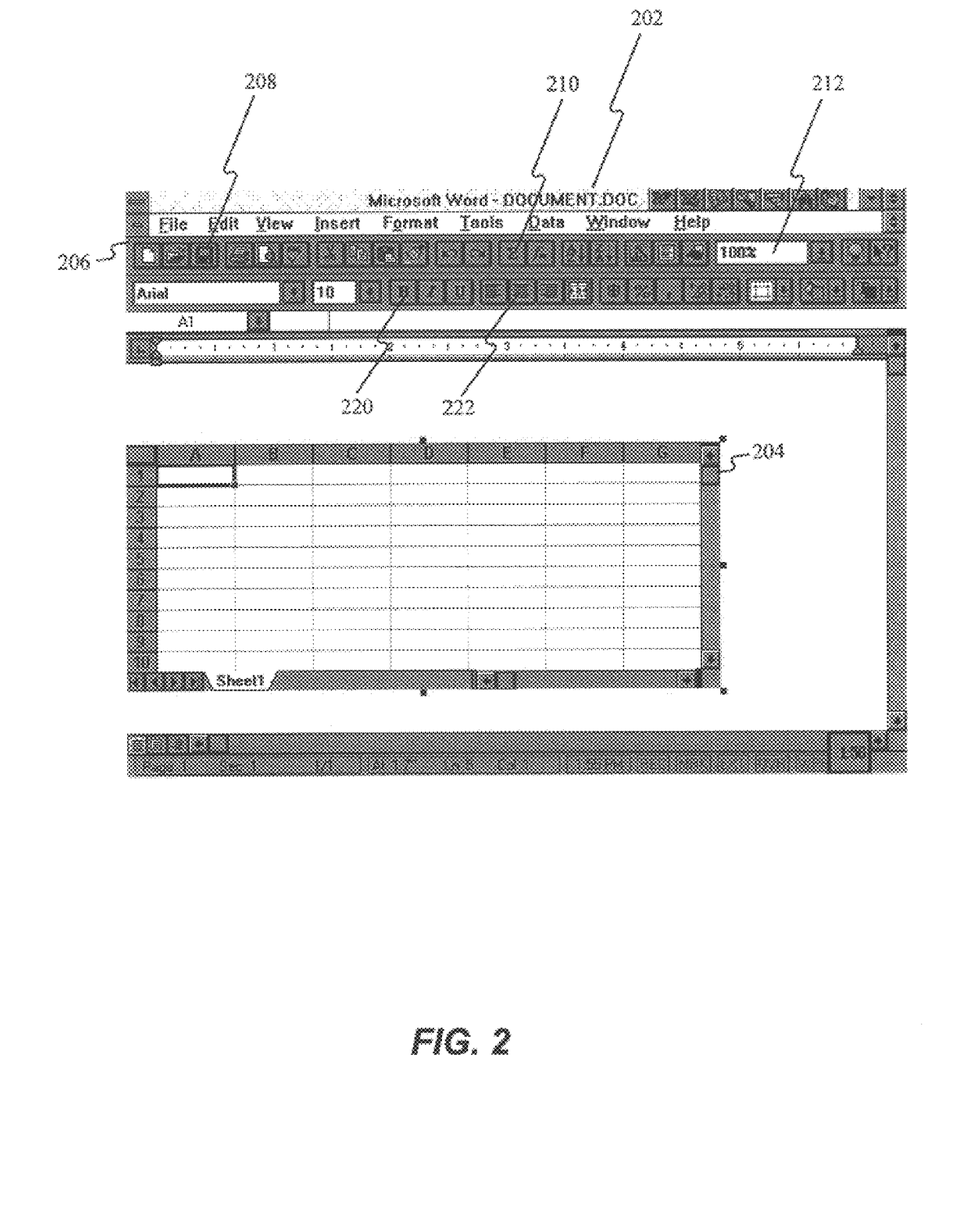
FIG. 2 illustrates a sample user interface for one embodiment of the present invention.
Figure 3:
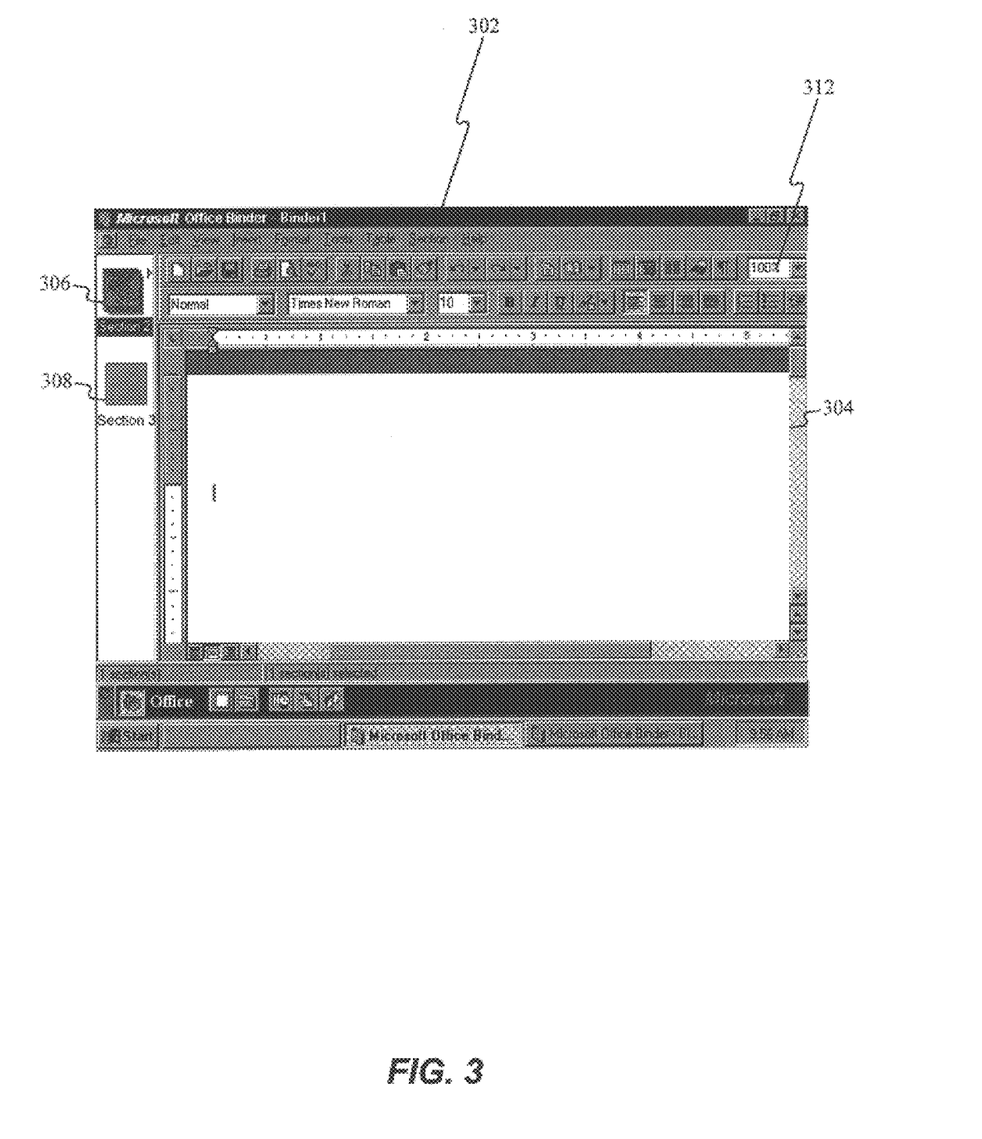
FIG. 3 illustrates a sample user interface for another embodiment of the present invention.

Before discussing the code and structures used to facilitate the code, sample user interfaces which illustrate the use of the command dispatch protocol will be discussed. Specifically, FIGS. 2–3 represent sample user interfaces producing an illustrative embodiment of the present invention, which will be described before the flowcharts of FIGS. 4–9. In particular, FIG. 2 represents a sample user interface in which the caller application program is a server application program and the callee application program is a container application program. Conversely, FIG. 3 represents a sample user interface in which the caller application program is a container application program and the callee application program is a server application program.

FIG. 2 illustrates a sample user interface for one embodiment of the present invention. The user interface contains a containee object's tool bar which is displayed on a video display 114 containing commands which apply to the object and are supported by a caller application program 108 (i.e., a server application program). The containee object's tool bar also contains commands which apply to the entire document and are supported by a callee application program 110 (i.e., a container application program). In particular, the container object 202 is a "MICROSOFT WORD" document. The containee object 204 is a "MICROSOFT EXCEL" worksheet. The "MICROSOFT EXCEL" worksheet has been activated, therefore, its tool bar is displayed. The server application program controls the tool bar. The tool bar 206 is shown with icons representing commands provided by the container application program, such as the Save command 208, and commands provided by the server application program, such as the AutoSum command 210. In conventional systems, typically, the server application program's commands are executable, but the container application program's commands are not executable; however, through the command dispatch protocol, both the server and container application programs' commands are executable. In particular, the user may select commands which are supported by either the server application program or the container application program while the containee object is activated. For example, the user may select the Save command supported by the container application program or the AutoSum command supported by the server application program. That is, the command dispatch protocol offers more functionality to a user. In particular, when a user selects a command supported by the server application program, the server application program executes that command. When a user selects a command supported by the container application program, the server application program follows the command dispatch protocol to programmatically dispatch a request to the container application program to execute that command.

FIG. 3 illustrates a sample user interface for another embodiment of the present invention. The user interface shows a container object which contains several containee objects. In FIG. 3, the container application program is a caller application program 108, and the server application program is a callee application program 110. The container object 302 is a Binder compound document which is provided by a Binder application program. A Binder compound document may contain data in different formats. For example, the Binder compound document contains a word processing document 306 and a worksheet document 308, each of which is a containee object. In a conventional system, typically, the Binder application program is not able to dispatch a request to execute a command to a containee object's server application program. However, through the command dispatch protocol, the Binder application program is able to both dispatch a request for status information on a command or a request to execute a command to a containee object's server application program. For example, in order to have the server application program save its associated containee object, the Binder application program may dispatch a request to execute the Save command to the server application program by following the command dispatch protocol.

The following discussion will be directed to the code that implements certain aspects of the preferred embodiment of the present invention. First, however, it may be useful to discuss the interfaces that enable the command dispatch protocol. Before discussing the interface used by the command dispatch protocol, it is useful to review some fundamental concepts of the Microsoft OLE 2.01 protocol. IUnknown is an interface that all objects must support by definition to comply with Microsoft OLE 2.01. One function identified in the IUnknown interface is the QueryInterface( ) function. When called, the QueryInterface function retrieves a pointer to an interface that is identified by an input argument that is passed to the function. Through the QueryInterface( ) function, the IMsoCommandTarget interface, which is provided by the preferred embodiment of the present invention, can be accessed. The callee application program incorporates and supports the IMsoCommandTarget interface, while the caller application program uses the IMsoCommandTarget interface.

The IMsoCommandTarget interface includes a QueryStatus( ) function and an Exec( ) function. First, FIGS. 4 and 5, which illustrate flowcharts that provide an overview of the steps performed to query an application program about the status of its commands, will be discussed. Then, FIGS. 6 and 7, which illustrate flowcharts that provide an overview of the steps performed to execute a command supported by an application program, will be discussed.

Figure 4:
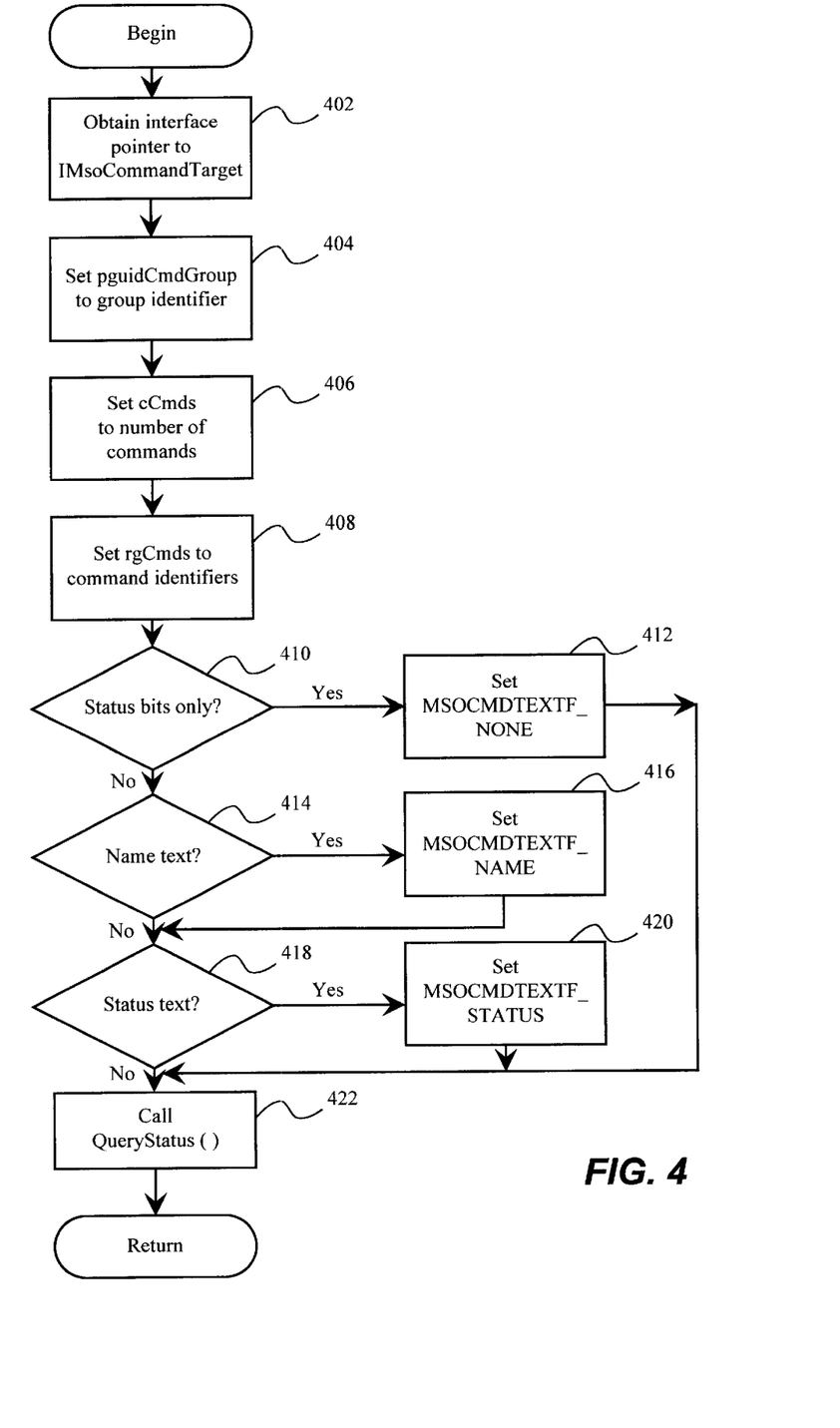
FIG. 4 illustrates a flowchart that provides an overview of the steps performed by a caller application program to obtain status information about commands provided by a callee application program using the QueryStatus( ) function of the IMsoCommandTarget interface.

FIG. 4 illustrates a flowchart that provides an overview of the steps performed by a caller application program 108 to obtain status information about commands provided by a callee application program 110. Initially, under the command dispatch protocol, a caller application program calls the QueryStatus( ) function to obtain a pointer to the IMsoCommandTarget interface provided by the present invention (step 402). The IMsoCommandTarget interface is defined as follows in C++.

```
interface IMsoCommandTarget : IUnknown {
    virtual HRESULT    QueryStatus (pguidCmdGroup, cCmds,
                                   rgCmds[ ], pcmdtext) = 0;
    virtual HRESULT    Exec (pguidCmdGroup, nCmdID,
                             nCmdExecopt, pvarargIn, pvarargOut) = 0;
}
```

The QueryStatus( ) function allows a caller application program to obtain status information about commands supported by a callee application program. The pguidCmdGroup argument is a command group identifier. A command group identifier specifies a grouping of related commands. The cCmds argument identifies the number of commands for which status information is requested. The rgCmds[ ] argument identifies an array containing one or more command identifiers, each of which specifies a particular command, along with a series of bits which a callee application program sets to indicate the status of a command. The pcmdtext argument is a structure which a caller application program uses to indicate whether textual status information is requested and which a callee application program uses to return requested textual status information.

Figure 6:
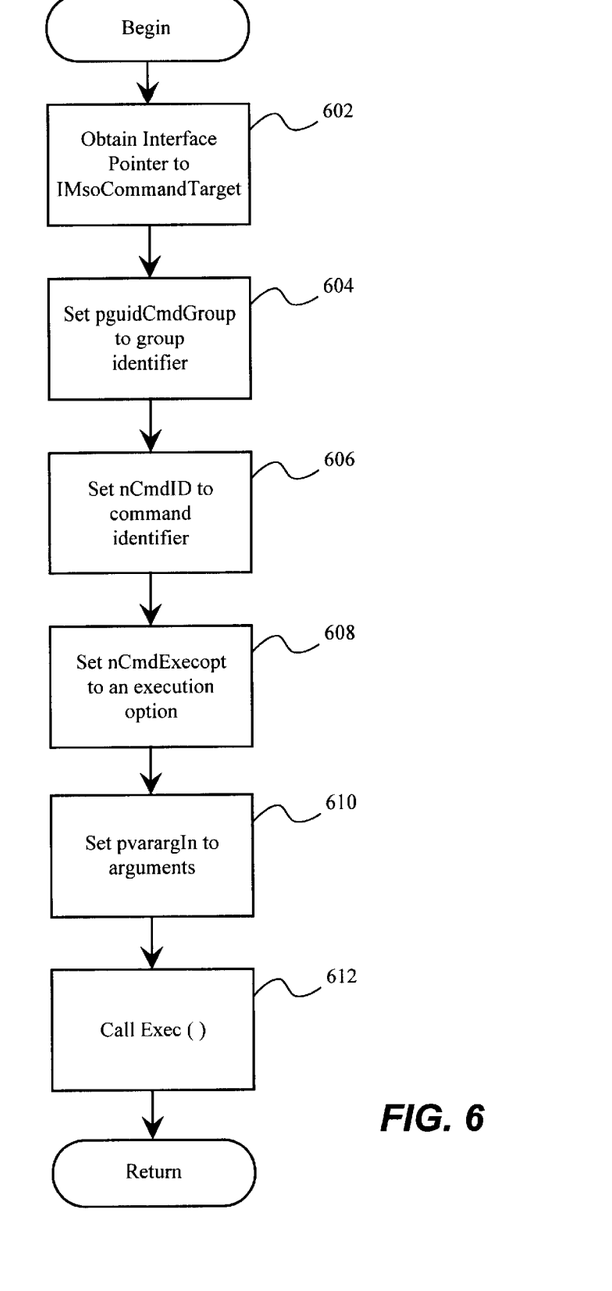
FIG. 6 illustrates the steps performed by the caller application program to execute a command supported by the callee application program using the Exec( ) function of the IMsoCommandTarget interface.

The Exec( ) function allows a caller application program to execute a command supported by a callee application program. Upon receiving a request to execute a command, the callee application program performs the action represented by that command. The pguidCmdGroup argument specifies a command group identifier. The nCmdID argument specifies a command identifier. The nCmdExecopt argument specifies execution options. The pvarargIn and pvarargOut arguments specify input and output arguments, respectively.

After obtaining an interface pointer to the IMsoCommandTarget (step 402), the caller application program sets the pguidCmdGroup argument to the command group identifier (step 404). The pguidCmdGroup argument uniquely identifies a group of related commands. For predefined commands provided by the command dispatch protocol (e.g., commands that are defined by the operating system 106), the pguidCmdGroup argument should be set to NULL. Next, the caller application program sets the cCmds argument to the number of commands (step 406). The cCmds argument identifies the total number of commands for which status information is being requested. After setting the cCmds argument, the caller application program sets the rgCmds argument to the command identifiers (step 408). The rgCmds argument is an array of MSOCMD data structures which are defined by the following:

```
typedef struct _tag MSOCMD {
    ULONG    cmdID;
    DWORD    cmdf;
} MSOCMD;
```

The cmdID argument identifies the command for which status information is requested. The cmdf argument is a series of bits which represent the status of a command. The caller application program sets these bits to zero. Later, when the callee application program responds to the QueryStatus( ) function call, the callee application program determines the status of a command specified by the cmdID argument and sets these bits in that command's cmdf argument, as will be discussed below. The cmdf argument is defined by the following bits:

```
enum {
    MSOCMDF_SUPPORTED   = 0x00000001,
    MSOCMDF_ENABLED     = 0x00000002,
    MSOCMDF_LATCHED     = 0x00000004,
    MSOCMDF_NINCHED     = 0x00000008
};
```

The MSOCMDF_SUPPORTED flag indicates that a command is supported. The MSOCMDF_ENABLED flag indicates that a command is enabled and may be executed. The MSOCMDF_LATCHED flag and MSOCMDF_NINCHED flag are related to the property commands of a selected group of data. A user may select a group of data using an input device 112, such as a mouse. A property is an attribute of the selected group of data, and a property command may be represented by an icon on a tool bar, such as a Bold property 220 or a Center Text property 222. When a property command is selected, that property becomes an attribute of the group of data The MSOCMDF_LATCHED flag indicates that a property command has been selected for the group of data. The MSOCMDF_NINCHED flag indicates that a property command has been selected for a portion of the group of data.

Continuing with the flowchart of FIG. 4, after setting the command identifiers (step 408), the caller application program may set flags to indicate the type of status information the caller application program desires. In particular, the caller application program can request a bit representation of the status of a command, a textual representation of the status of a command, or a textual representation of the name of a command. The flags the caller may set to indicate the type of status information requested are the following:

```
enum {
    MSOCMDTEXTF_NONE    = 0,
    MSOCMDTEXTF_NAME    = 1
    MSOCMDTEXTF_STATUS  = 2,
};
```

The MSOCMDTEXTF_NONE flag indicates that textual information is not being requested. The MSOCMDTEXTF_NAME flag indicates a request for the textual representation of the name of a command. The MSOCMDTEXTF_STATUS flag Mindicates a request for the textual representation of the status of a command. A caller application program may request only a bit representation of the status of a command or may request the bit representation of the status of the command along with any combination of the textual representation of the status of the command or the textual representation of the name of the command. These flags are set in the cmdtextf argument of the MSOCMDTEXT data structure, which is defined as follows:

```
typedef struct _tag MSOCMDTEXT {
    DWORD    cmdtextf;
    ULONG    cwActual;
    ULONG    cwBuf;
    wchar_t  rgwz [ ];
} MSOCMDTEXT;
```

The caller application program requests the type of status information desired by setting the bits in the cmdtextf argument. The caller application program also provides the size of the buffer it is providing to the callee application program with the cwBuf argument. Later, when the callee application program returns textual information to the caller application program, the callee application program stores that textual information in the rgwz [ ] argument. The callee application program also stores the actual size of the text string it is returning to the caller application program in the cwActual argument.

If the caller application program is only requesting a bit representation of the status of a command (step 410), then the caller application program sets the MSOCMDTEXTF_NONE flag (step 412) to indicate that the caller application program does not want to receive any textual information. If the caller application program is requesting the textual name of a command (step 414), then the caller application program sets the MSOCMDTEXTF_NAME flag (step 416). Additionally, if the caller application program is requesting a textual representation of the status of a command (step 418), then the caller application program sets the MSOCMDTEXTF_STATUS flag (step 420). After appropriately setting all of the arguments, the caller application program calls the QueryStatus( ) function (step 422).

The following table summarizes the arguments passed to the callee application program by the caller application program for the QueryStatus( ) function:

TABLE 1

| Argument | Type | Description |
| --- | --- | --- |
| pguidCmdGroup | const GUID | The command group identifier. All the commands that are passed in the rgCmds array belong to this group. The command group identifier is NULL for predefined commands. |
| cCmds | ULONG | The count of commands whose status is being queried. This will be the size of the rgCmds array. |
| rgCmds | MSOCMD | An array of MSOCMD structures. |
| pcmdText | MSOCMDTEXT | The argument used by the callee application program to return textual information to the caller application program. |
| returns | HRESULT | The code returned may be one of the following:<br>S_OK<br>E_FAIL<br>MSOCMDERR_E_UNKNOWNGROUP |

Figure 5:
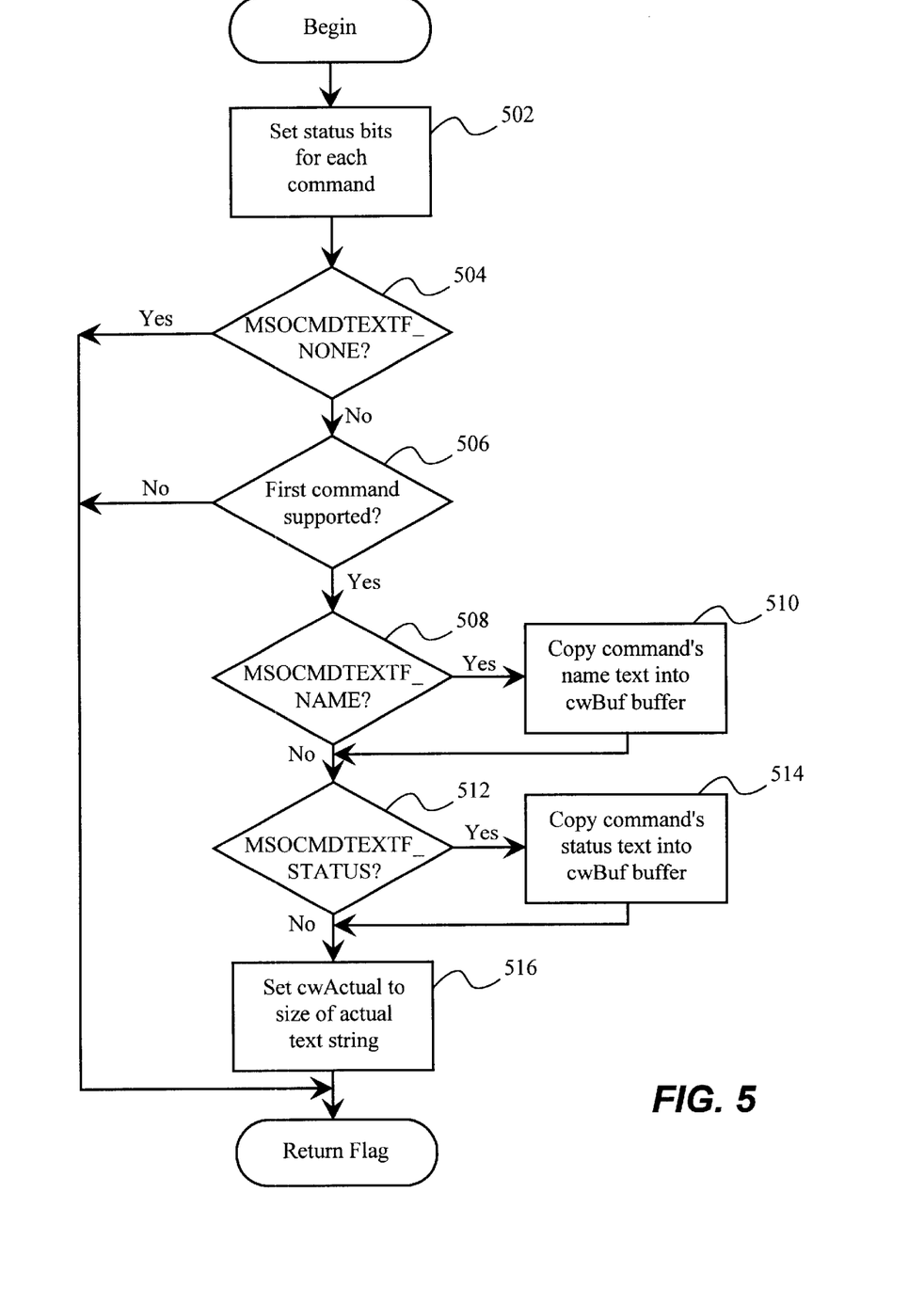
FIG. 5 illustrates the steps taken by a callee application program upon receiving a QueryStatus( ) function call from a caller application program through the IMsoCommandTarget interface.

FIG. 5 illustrates the steps taken by a callee application program upon receiving a QueryStatus( ) function call from a caller application program through the IMsoCommandTarget interface. First, the callee application program sets the bit representation of the status of each command identified by the cmdID argument of the rgCmds argument (step 502). The rgCmds argument is received by the callee application program as an input argument from the caller application program. The status bits which may be set are the following:

```
enum {
    MSOCMDF_SUPPORTED  = 0x00000001,
    MSOCMDF_ENABLED    = 0x00000002,
    MSOCMDF_LATCHED    = 0x00000004,
    MSOCMDF_NINCHED    = 0x00000008
};
```

These status bits are set by the callee application program in the cmdf argument for each command identified by the caller application program in the rgCmds argument. Then, if the MSOCMDTEXTF_NONE flag has been set (step 504), the callee application program returns. As discussed above, by setting the MSOCMDTEXTF_NONE flag, the caller application program indicates that it does not want to receive textual information about the status of a command. Otherwise, the callee application program determines whether the first command in the command array identified by the rgCmds [ ] argument is supported (step 506). By definition, the callee application program returns textual information about the first command in the rgCmds array. If none of the commands are supported, then the callee application program returns. Otherwise, the callee application program returns the textual information requested through the following data structure, which the callee application program receives as an input argument from the caller application program:

```
typedef struct _tag MSOCMDTEXT {
    DWORD    cmdtextf;
    ULONG    cwActual;
    ULONG    cwBuf;
    wchar_t  rgwz [ ];
} MSOCMDTEXT;
```

The callee application program determines whether the MSOCMDTEXTF_NAME flag has been set (step 508). When the MSOCMDTEXTF_NAME flag has been set, the callee application program stores the found command's textual name in the rgwz [ ] argument (step 510). The rgwz [ ] argument is an array into which the callee application program stores the textual information. Then, if the MSOCMDTEXTF_STATUS flag has been set (step 512), the callee application program copies the found command's status text into the rgwz [ ] argument (step 514). In addition, the callee application program sets the cwActual argument to the size of the actual text string (step 516).

When the rgwz [ ] argument is not large enough to hold all of the text, the callee application program writes as much text as it can into the rgwz [ ] argument. The caller application program can later determine whether the rgwz [ ] argument was able to store all of the textual information by comparing the size of the buffer in the cwBuf argument with the actual size of the textual string in the cwActual argument. Continuing with the flowchart, the callee application program also returns a code indicating whether or not the QueryStatus( ) function call was successful. The following codes may be returned:

S_OK
E_FAIL
MSOCMDERR_E_UNKNOWNGROUP

The S_OK code indicates the QueryStatus( ) function call was successful. The E_FAIL code indicates the QueryStatus( ) function call was not successful. The MSOCMDERR_E_UNKNOWNGROUP code indicates that an unknown command group identifier was passed in through the pguidCmdGroup argument.

Figure 7:
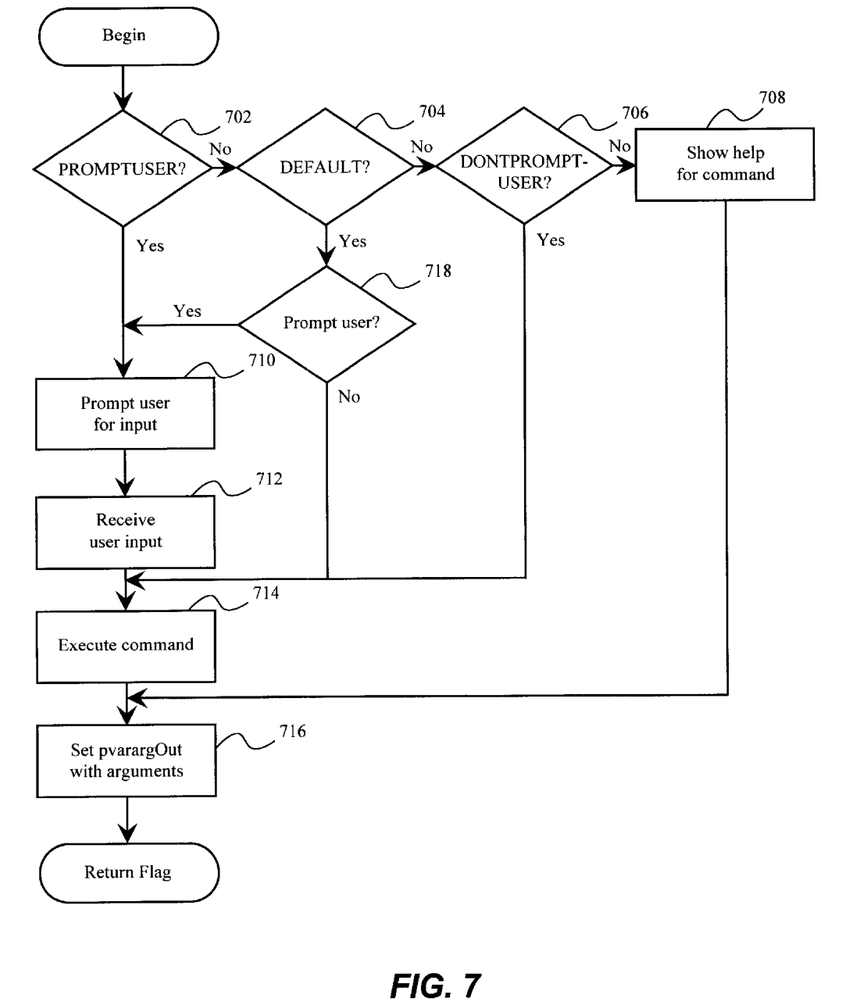
FIG. 7 illustrates the steps performed by a callee application program upon receiving an Exec( ) function call from a caller application program through the IMsoCommandTarget interface.

FIG. 6 and FIG. 7 illustrate the use of the Exec( ) function of the IMsoCommandTarget interface. In particular, FIG. 6 illustrates the steps performed by the caller application program to execute a command supported by the callee application program. In FIG. 6, the caller application program first obtains the interface pointer to the IMsoCommandTarget interface (step 602). Then the caller application program sets the pguidCmdGroup argument to the command group identifier to specify a particular command group (step 604). As discussed above, to execute a predefined command provided by the command dispatch protocol, the caller application program sets the pguidCmdGroup argument to NULL. Next, the caller application program sets the nCmdID argument to the command identifier (step 606) to identify the command within the command group identified by the pguidCmdGroup argument to execute. After this, the caller application program sets the nCmdExecopt argument to an execution option (step 608). The execution options determine how a command will be executed. The following are the possible execution options:

```
enum {
    MSOCMDEXECOPT_PROMPTUSER      = 1,
    MSOCMDEXECOPT_DONTPROMPTUSER  = 2,
    MSOCMDEXECOPT_DODEFAULT       = 3,
    MSOCMDEXECOPT_SHOWHELP        = 4
};
```

The MSOCMDEXECOPT_PROMPTUSER flag indicates that the callee application program should prompt the user for input before executing the command. The MSOCMDEXECOPT_DONTPROMPTUSER flag indicates that the callee application program should not prompt the user for input before executing the command. The MSOCMDEXECOPT_DODEFAULT flag indicates that the callee application program should determine whether user input is required and execute the command based on this determination. The MSOCMDEXECOPT_SHOWHELP flag indicates that the callee application program should provide help information on the command rather than execute the command.

Continuing with the flowchart of FIG. 6, after setting the execution options (step 608), the caller application program then sets the pvarargIn argument to the input arguments (step 610). The pvarargIn argument is of the VARIANTARG type defined by OLE 2.01. The VARIANTARG type is a union of various types, including integer and floating point. Through the VARIANTARG type, a caller application program can pass in a list of arguments of different types. After appropriately setting the arguments, the caller application program calls the Exec( ) function (step 612).

The following table summarizes the arguments passed in to the Exec( ) function:

TABLE 2

| Argument | Type | Description |
| --- | --- | --- |
| pguidCmdGroup | const GUID | The command group identifier. All the commands that are passed in the rgCmds array belong to this group. The command group identifier is NULL for predefined commands. |
| nCmdID | DWORD | The command identifier. |
| nCmdExecopt | DWORD | The execution options. |
| pvarargIn | VARIANTARG | The input arguments for the command. |
| pvarargOut | VARIANTARG | The output arguments for the command. |
| returns | HRESULT | The code returned may be one of the following: S_OK E_FAIL MSOCMDERR_E_UNKNOWNGROUP MSOCMDERR_E_NOTSUPPORTED MSOCMDERR_E_DISABLED MSOCMDERR_E_NOHELP MSOCMDERR_E_CANCELED |

FIG. 7 illustrates the steps performed by a callee application program upon receiving an Exec( ) function call from a caller application program through the IMsoCommandTarget interface. First, if the MSOCMDEXECOPT_PROMPTUSER flag is set (step 702), then the callee application program prompts the user for input (step 710). After prompting the user for input, the callee application program receives user input (step 712). Next, the callee application program executes the command identified by the nCmdID argument (step 714). Then, the callee application program sets the pvarargOut argument with the output arguments (step 716). The pvarargOut argument is of the VARIANTARG type and represents the output arguments sent by the callee application program to the caller application program. If the MSOCMDEXECOPT_PROMPTUSER flag is not set, and the MSOCMDEXECOPT_DODEFAULT flag is set, then the callee application program determines whether or not to prompt the user (step 718). If the user does not need to be prompted, then the callee application program executes the command (step 714) and sets the pvarargOut argument (step 716). If the user needs to be prompted, then the user is prompted (step 710). After receiving user input (step 712), the caller application program executes the command (step 714) and sets the pvarargout argument (step 716). If the MSOCMDEXECOPT_DONTPROMPTUSER flagg is set, then the callee application program executes the command without prompting the user (step 714) and sets the pvarargOut argument (step 716). Otherwise, the caller application program has set the MSOCMDEXECOPT_SHOWHELP flag, and the callee application program provides help information for the command (step 708). Next, the callee application program sets the pvarargOut argument with the output arguments(step 716). In addition, the callee application program returns a code indicating whether the Exec( ) function call was successful. The following codes may be returned:

S_OK
E_FAIL
MSOCMDERR_E_UNKNOWNGROUP
MSOCMDERR_E_NOTSUPPORTED
MSOCMDERR_E_DISABLED
MSOCMDERR_E_NOHELP
MSOCMDERR_E_CANCELED

The S_OK code indicates that the Exec( ) function call was successful and that the requested command was executed successfully. The E_FAIL code indicates that the Exec( ) function call was not successful. The MSOCMDERR_E_UNKNOWNGROUP code indicates that an unknown command group identifier was passed in through the pguidCmdGroup argument. The MSOCMDERR_E_NOTSUPPORTED code indicates that the requested command is not supported. The MSOCMDERR_E_DISABLED code indicates the requested command is supported but not currently executable. The MSOCMDERR_E_NOHELP code indicates that the requested command has no associated help information. The MSOCMDERR_E_CANCELED code command indicates that when a user canceled the execution of the command before the execution was completed.

Following is a list of predefined commands that have been defined by the command dispatch protocol.

MSOCMDID_OPEN
    MSOCMDID_NEW
    MSOCMDID_SAVE
    MSOCMDID_SAVEAS
    MSOCMDID_SAVECOPYAS
    MSOCMDID_PRINT
    MSOCMDID_PRINTPREVIEW
    MSOCMDID_PAGESETUP
    MSOCMDID_SPELL
    MSOCMDID_PROPERTIES
    MSOCMDID_CUT
    MSOCMDID_COPY
    MSOCMDID_PASTE
    MSOCMDID_PASTESPECIAL
    MSOCMDID_UNDO
    MSOCMDID_REDO
    MSOCMDID_SELECTALL
    MSOCMDID_CLEARSELECTION
    MSOCMDID_ZOOM
    MSOCMDID_GETZOOMRANGE The MSOCMDID_OPEN command enables opening of a currently existing object. The MSOCMDID_NEW command enables opening of a new object. The MSOCMDID_SAVE command enables saving of a object. The MSOCMDID_SAVEAS command enables saving a object with a newly assigned object name. The MSOCMDID_SAVECOPYAS command enables saving a copy of a object with an assigned object name. The MSOCMDID_PRINT command enables printing of an object. The MSOCMDID_PRINTPREVIEW command enables viewing the printer formatting of an object. The MSOCMDID_PAGESETUP command enables adjusting the formatting of a page setup. The MSOCMDID_SPELL command enables checking the spelling of an object. The MSOCMDID_PROPERTIES command enables viewing the properties of an object. The MSOCMDID_CUT command enables removing an object from a document. The MSOCMDID_COPY command enables copying of an object. The MSOCMDID_PASTE command enables pasting an object which was cut or copied. The MSOCMDID_PASTESPECIAL command enables pasting an object with special formatting. The MSOCMDID_UNDO command enables undoing a command which was earlier executed. The MSOCMDID_REDO enables re-executing a command which was earlier undone. The MSOCMDID_SELECTALL command enables selecting an object. The MSOCMDID_CLEARSELECTION command enables clearing an earlier selection. The MSOCMDID_ZOOM command enables adjusting the zoom value of an object. The MSOCMDID_GETZOOMRANGE command enables receiving the range of possible zoom values.

Application defined commands may be defined by generating a unique command group identifier to identify a group of commands, and, for each command in that group, generating a unique command identifier. Then, if a callee application program supports these commands (i.e., provides code for these commands), a caller application program may use the QueryStatus( ) function and the Exec( ) function of the IMsoCommandTarget interface to query or execute the application defined commands supported by the callee application program.

In an alternative embodiment, the command dispatch protocol is applicable to menu lists. When a user invokes an application program, the application program typically displays a user interface that has a menu list containing menus. The menu list provides the user with options for interacting with the application program. Each of the menus contains menu items. A menu item may be a sub-menu or a command to be executed by the application program. A sub-menu is a menu contained within another menu, and the sub-menu includes menu items. A command of a menu typically represents an action that can be performed by an application program, such as saving a document. When a user selects a menu, the application program displays the menu items in the selected menu. A user may execute a command by selecting the command in the menu list.

A container object and a containee object typically have their own menu lists. When a containee object is activated, by convention, the containee object's menu list and the container object's menu list are merged to form a merged menu list. The merged menu list contains commands that are supported by the container application program, which apply to the container object, such as a Save command. The merged menu list also contains commands that are supported by the server application program, which apply to the server object, such as an Insert Picture command. The server application program does not perform commands which apply to the container object. However, the command dispatch protocol enables the server application program to programmatically dispatch requests for status information and requests to execute commands to the container application program. Similarly, the command dispatch protocol enables the container application program to programmatically dispatch requests for status information and requests to execute commands to the server application program.

In summary, the command dispatch protocol enhances user interfaces by enabling two applications (e.g., a caller application program and a callee application program) to share a tool bar or a menu list. In addition, the command dispatch protocol enables efficient interaction because it minimizes context switching between the processes. Additionally efficiency is gained due to the minimal overhead for interprocess communication through the command dispatch protocol. Furthermore, under the command dispatch protocol, a user is provided with increased functionality. In particular when commands are displayed as part of a user interface which are supported by either a container application program or a server application program, the user may select any of the commands.

Although the methods and systems of the present invention have been described in terms of a preferred embodiment, it is not intended that the invention be limited to this embodiment. Modifications within the spirit of the invention will be apparent to those skilled in the art. For example, although examples have been discussed in an object-oriented environment, the methods and systems of the present invention may be practiced in an environment which is not object oriented. In addition, although in a preferred embodiment, textual status information is returned for the first command in the rgCmds array, it is possible to practice the invention with a data structure (i.e., an array) which returns textual status information for all of the supported commands specified in the rgCmds array. The scope of the present invention is defined only by the claims that follow.

What is claimed is:

1. In a data processing system, a method comprising the computer-implemented steps of:

providing a first stand alone application program;

providing a second stand alone application program, the second stand alone application program having a plurality of commands, each of the commands representing an action that is performable by the second stand alone application program and having a status that indicates a current condition of that command;

requesting at the first stand alone application program through a command dispatch protocol that supports a command based interface the status of one of the commands of the second stand alone application program;

under control of the second stand alone application program and through the command dispatch protocol,
determining the status of the requested one of the commands;
forwarding the status of the requested one of the commands to the first stand alone application program; and
receiving the status of the requested one of the commands at the first stand alone application program from the second application.

2. The method of claim 1, wherein each of the commands is a command defined by the second stand alone application program.

3. The method of claim 1, further comprising:

requesting at the first stand alone application program from the second stand alone application program a status of a plurality of commands;

under control of the second stand alone application program and through the command dispatch protocol,
determining the status of each of the requested commands; and
forwarding the status of each of the requested commands to the first stand alone application program; and receiving the status of each of the requested commands at the first stand alone application program from the second application.

4. In a data processing system having an operating system and a user interface, a method comprising the computer-implemented steps of:

providing a first stand alone application program, the first application having a plurality of commands, each of the commands from the first stand alone application program representing an action that is performable by the first stand alone application program;

providing a second stand alone application program, the second stand alone application program having a plurality of commands, each of the commands from the second stand alone application program representing an action that is performable by the second stand alone application program;

in a user interface, displaying one of the plurality of commands from the first stand alone application program as executable and one of the plurality of commands from the second stand alone application program as executable, simultaneously in a common toolbar;

requesting at the first stand alone application program and through a command dispatch protocol that supports a command based interface a name of one of the displayed commands from the second stand alone application program, the name providing a textual representation of one of the commands;

under control of the second stand alone application program and through the command dispatch protocol,
determining the name of the requested one of the commands; and
forwarding the determined name of the requested one of the commands to the first stand alone application program; and receiving the determined name of the requested one of the commands at the first stand alone application program from the second stand alone application program.

5. The method of claim 4, wherein each of the commands from the second stand alone application program is a command defined by the second stand alone application program.

6. In a data processing system having an operating system and a user interface, a method comprising the computer-implemented steps of:

providing a first stand alone application program, the first stand alone application program having a plurality of commands, each of the commands from the first stand alone application program representing an action that is performable by the first stand alone application program;

providing a second stand alone application program, the second stand alone application program having a plurality of commands, each of the commands from the second stand alone application program representing an action that is performable by the second, stand alone application program and having a status that indicates a current condition of that command;

in a user interface, displaying one of the plurality of commands from the first stand alone application program as executable and one of the plurality of commands from the second stand alone application program as executable, simultaneously;

requesting at the first stand alone application program and through a command dispatch protocol that supports a command based interface a textual representation of the status of one of the commands displayed from the second stand alone application program;

under control of the second stand alone application program and through the command dispatch protocol,
determining the status of the requested one of the commands;
determining the textual representation of the status of the requested one of the commands; and
forwarding the determined textual representation of the status of the requested one of the commands to the first stand alone application program; and receiving the determined textual representation of the status of the requested one of the commands at the first stand alone application program from the second stand alone application program.

7. The method of claim 6, wherein each of the commands from the second stand alone application program is a command defined by the second stand alone application program.

8. In a data processing system having a processor running a first stand alone application program, a method comprising the computer-implemented steps of:

providing a first stand alone application program with associated commands, where each of the associated commands represents an action that is performable by the first stand alone application program;

providing a second stand alone application program with associated commands, where each of the associated commands represents an action that is performable by the second stand alone application program and having a status that indicates the current condition of that command;

providing a command dispatch protocol that supports a command based interface for performing command queries and command execution;

displaying one of the commands associated with the first stand alone application program as being executable and one of the commands associated with the second stand alone application program as being executable, simultaneously in a common toolbar;

under control of the first stand alone application program, receiving a request to execute one of the associated commands of the second stand alone application program; and under control of the second stand alone application program, executing the requested command.

9. The method of claim 8 wherein after the step of under control of the second stand alone application program, executing the requested one of the associated commands, returning to the first stand alone application program an indication of whether the action was performed successfully.

10. The method of claim 8 wherein the step of under control of the first stand alone application, receiving a request to execute one of the associated commands of the second stand alone application program further comprises the first stand alone application program providing the second stand alone application program with an execution option through the command dispatch protocol which indicates whether to prompt a user for input prior to performing the action represented by the executed one of the associated commands.

11. The method of claim 8 wherein the step of under control of the first stand alone application program, receiving a request to execute one of the associated commands of the second stand alone application program further comprises the first stand alone application program providing the second stand alone application program with an execution option through the command dispatch protocol which indicates whether to perform the action represented by the executed one of the associated commands or provide help information for the executed one of the associated commands.

12. The method of claim 8, wherein each of the associated commands is a command defined by the second stand alone application program.

13. The method of claim 8 wherein each of the associated commands has a status indicating a current condition of that command and wherein the step of under control of the second stand alone application program, executing the requested one of the associated commands further comprises:

determining at the second stand alone application program through the command dispatch protocol whether the status of the requested one of the associated commands indicates that the requested one of the associated commands is executable; and when the requested one of the associated commands is executable, performing the action represented by the executed one of the associated commands.

14. In a data processing system having an operating system and a user interface, a method comprising the computer-implemented steps of:

providing a first stand alone application program, the first stand alone application program providing a compound document, the compound document being a word processing document that contains data in different formats, including server data which is data in a server format, the first stand alone application program having a first command that represents an action which is performable by the first stand alone application program on the compound document;

providing a second stand alone application program, the second. stand alone application program for viewing and editing the server data contained in the compound document provided by the first stand alone application program, the second stand alone application program having a second command not defined to the first application which represents an action that is performable by the second stand alone application program on the server data;

providing a command dispatch protocol that supports a command based interface for performing command queries and command execution;

in the user interface, displaying the first command as executable and the second command as executable, simultaneously in a common toolbar;

under the control of the first stand alone application program,
receiving a selection for the first command;
performing the action represented by the first command on the compound document;
receiving a selection for the second command;
initiating a request from the first stand alone application program to the second stand alone application program through the command dispatch protocol to execute the second command on the server data in the compound document.

15. The method of claim 14, further comprising the steps of:

when the second stand alone application program receives the request for the second command, the second stand alone application program executing the second command on the server data contained in the compound document provided by the first stand alone, application program; and returning control to the first stand alone application program.

16. In a data processing system having a video display and a processor running a first stand alone application program and a second stand alone application program, the first stand alone application program having a first object and a first window environment, the second stand alone application program having a second object which is contained within the first object, the method comprising the computer-implemented steps of:

providing a first command defined to the first stand alone application program representing an action that is performable by the first stand alone application program on the first object;

providing a second command defined to the second stand alone application program and not defined to the first stand alone application program representing an action that is performable by the second stand alone application program on the second object;

providing a command dispatch protocol that supports a command based interface;

displaying the first object within the first window environment on the video display;

displaying the second object within the first object in the displayed first window environment on the video display;

displaying the first command as executable and the second command as executable on the video display, simultaneously; and under the control of the first stand alone application program, when the displayed first command is selected by a user, the first stand alone application program performing the action requested by the displayed first command on the first object; and when the displayed second command is selected by the user the object oriented command dispatch protocol interface receiving a request from the first stand alone application program, and the second stand alone application program performing the action represented by the displayed second command on the second object in accordance with the request forwarded to the second stand alone application program by the command dispatch protocol.

17. In a data processing system, a method comprising the computer-implemented steps of:

providing a processor that runs a first stand alone application program and a second stand alone application program, the second application having associated commands, each of the associated commands representing an action that is performable by the second stand alone application program and having a status that indicates the current condition of that command;

providing a command dispatch protocol that supports a command based interface which is executable by the first stand alone application program to obtain status information on one of the associated commands, the first stand alone application program specifying one of the associated commands;

executing at the first stand alone application program the command dispatch protocol, specifying one of the associated commands; and providing at the second stand alone application program status information on the specified one of the associated commands, upon the first application executing the command dispatch protocol.

18. The method of claim 17, wherein each of the associated commands is a command defined by the second stand alone application program.

19. A data processing system comprising:

a processor that runs a first stand alone application program and a second stand alone application program, the second stand alone application program having associated commands, each of the associated commands representing an action that is performable by the second stand alone application program and having a status that indicates a current condition of that command;

a video display for displaying each of the associated commands;

a command dispatch protocol that supports a command based interface that includes:

a status message generator for determining status information about one of the associated commands of the second stand alone application program, the status message generator comprising:

a status message receiver for receiving from the first stand alone application program a request for status information about one of the associated commands of the second stand alone application program, the request specifying one of the associated commands;

a status message source for retrieving from the second stand alone application program the requested status information about the specified one of the associated commands; and a status message provider for returning to the first stand alone application program the requested status information about the specified one of the associated commands.

20. The system of claim 19, wherein the requested status information is a name of one of the commands, the name providing a textual representation of one of the commands.

21. The system of claim 19, wherein the requested status information is a textual representation of a status of one of the commands.

22. A data processing system comprising:

a processor that runs a first stand alone application program and a. second stand alone application program, the second stand alone application program having associated commands, each of the associated commands representing an action that is performable by the second stand alone application program and having a status that indicates the current condition of that command;

a video display for displaying each of the associated commands;

a command dispatch protocol that supports a command based interface, that includes a command executing mechanism for executing one of the associated commands of the second stand alone application program, the command executing mechanism comprising:

a command receiver for receiving from the first stand alone application program a request to execute one of the associated commands of the second stand alone application program, the request specifying one of the associated commands; and a command performer for performing the action represented by the specified one of the associated commands at the second stand alone application program.

* * * * *